United States Patent [19]

Cleasby

[11] Patent Number: 5,601,113
[45] Date of Patent: Feb. 11, 1997

[54] HOT VALVE FOR SUBMERGED PUMP SYSTEM

[75] Inventor: Leslie J. M. Cleasby, Novato, Calif.

[73] Assignee: Cleasby Manufacturing Company, Inc., San Francisco, Calif.

[21] Appl. No.: 390,086

[22] Filed: Feb. 17, 1995

[51] Int. Cl.⁶ .................................................. F16K 1/20
[52] U.S. Cl. .................. 137/568; 137/625.44; 137/875; 52/749.12; 126/343.5 A
[58] Field of Search .................... 137/568, 861, 137/875, 625.44; 417/423.3; 52/749.12, 742.13, 742.14; 126/343.5 R, 343.5 A; 222/318, 385; 415/56.2, 56.4, 56.5, 58.4, 58.5, 148

[56] References Cited

U.S. PATENT DOCUMENTS

| | | |
|---|---|---|
| 825,694 | 7/1906 | Barbaroux . |
| 1,065,467 | 6/1913 | Piel . |
| 1,081,744 | 12/1913 | Hubbard . |
| 2,368,120 | 1/1945 | Downey . |
| 4,247,022 | 1/1981 | Fung et al. ......................... 222/318 |

FOREIGN PATENT DOCUMENTS 957997  5/1964  United Kingdom .

Primary Examiner—Thomas E. Denion
Assistant Examiner—Christopher Verdier
Attorney, Agent, or Firm—Limbach & Limbach L.L.P.

[57] ABSTRACT

An improved hot valve system for use in a hot melting kettle of the type used for substances such as asphalt includes a surge chamber having a first outlet in fluid communication with a vertical discharge pipe, and a second outlet open to the interior of an asphalt kettle. The surge chamber has a diameter greater than that of the discharge pipe. Molten asphalt within the kettle is pumped into the surge chamber via a pipe connected to the output flow from a submerged pump. A manually operable valve has a closed condition in which it blocks the flow of asphalt through the second outlet in the surge chamber to compel the flow of asphalt through the vertical discharge pipe, and an opened condition in which asphalt flows out the second outlet and into the kettle.

19 Claims, 3 Drawing Sheets

HOT VALVE FOR SUBMERGED PUMP SYSTEM

FIELD OF THE INVENTION

The present invention relates to the field of submerged pump systems of the type used in hot melting kettles, and particularly to hot valve configurations used for controlling the flow of hot asphalt and other substances through hot melting kettles.

BACKGROUND OF THE INVENTION

A melting kettle is a large metallic container having a heating means used to melt and heat asphalt or similar substances to the temperature at which the asphalt or other substance may be applied to a work surface such as a roof. Melting kettles are equipped with submerged pump systems which circulate the asphalt through the kettle when a swing valve (called a "hot valve") on the pump system is open, and which pump the asphalt through a vertical discharge pipe when the valve is closed.

During normal use, the melting kettle is positioned with the vertical discharge pipe extending to a roof to which asphalt is to be applied. A worker stationed on the roof controls the opening and closing of the valve to stop and start the flow of asphalt to the roof. The worker uses a rope connected to the hot valve by rod linkages to control asphalt flow. To initiate flow of asphalt to the roof, the worker closes the hot valve by pulling the rope to pivot the valve seat into a closed condition. To stop asphalt flow to the roof, the worker releases tension on the rope and allows the valve seat to pivot under fluid pressure into the opened condition.

FIG. 1 shows a prior art submerged pump system and hot valve. The prior art system includes a platform 12 proportioned to cover a large opening in a melting kettle (not shown). Submerged pump 14 is mounted to and suspended from the platform 12 such that the pump 14 is inside the melting kettle during use. The pump 14 is made operable by a system of drive components collectively designated 16 and located within a housing 18 on the platform 12, and a rotor shaft (not shown) located inside a rotor shaft housing 13 which is suspended from the platform 12. An engine (not shown) is coupled to the drive components 16 and provides the energy necessary for driving the pump 14.

A series of flow lines are provided for re-circulating the molten asphalt within the kettle and for directing the molten asphalt to a work site when needed. A 90° elbow pipe 20 is connected to the pump 14, and a second elbow pipe 24 is attached to an opposite end of the elbow pipe 20 by a pair of nipples 22 and a hex bolt 23.

A tee 28 having two horizontally facing openings and a vertically facing opening is attached to elbow pipe 24 by another nipple 26 at one of the tee's horizontally facing openings. A third elbow pipe 32 is attached to the tee 28 at the other horizontally extending opening in the tee 28. A vertical discharge pipe 30 is attached to the tee 28 at the vertically facing opening of the tee 28.

Another nipple 34 extends downwardly from elbow pipe 32 and connects the elbow pipe 32 to a hot valve 36. The valve 36 is comprised generally of a valve body 37 connected to and extending longitudinally from the nipple 34, an operating lever 38 pivotally attached to valve body 37 by a hinge 40, and a valve seat 42 attached to operating lever 38 such that it faces opening 44 of body 37.

A rod linkage 46 is pivotally attached to the operating lever 38, opposite from the hinge 40. The valve 36 can be closed and opened by the raising and lowering, respectively, of the rod 46. As described above, raising and lowering of the rod 46 is accomplished by the pulling and releasing of a rope 47 coupled to the rod 46 and extending to a roof (not shown) where a worker is stationed.

When the valve 36 is in the closed condition (shown in solid lines in FIG. 1), valve seat 42 prevents asphalt flow through opening 44 in the valve body 37. Hot asphalt entering the pump system via an inlet pipe (not shown) in the pump 14, thus travels through the elbows 20 and 24 and, upon reaching the tee 28, is pumped vertically into and through the vertical discharge pipe 30. When the valve 36 is opened (represented by dashed lines in FIG. 1) hot asphalt pumps through the elbows 20 and 24, through the tee 28 to the elbow 32 and then downwardly through the body 37 and out the opening 44 into the melting kettle.

When the valve 36 is moved from the closed condition (in which asphalt is delivered to the roof) to the opened condition (in which asphalt is circulated through the melting kettle), there often is asphalt inside the vertical discharge pipe 30 which has not yet reached the roof or other work area. This asphalt flows downwardly to the tee 28, through elbow 32, and into the kettle via valve opening 44.

While the hot valve and submerged pump systems of the prior art satisfactorily pump hot asphalt through melting kettles and through vertical discharge pipes, certain improvements in the characteristics of the hot valve systems are desired. For example, it is desirable to reduce the likelihood of carbon buildup in the hot valve and in the many fittings and pump lines. Moreover, back pressure on the pump and engine can occur due to the many fittings, elbow pipes, and pump lines through which the molten asphalt must be pushed by the pump. It is desirable to reduce this back pressure in order to maximize engine life. Also desirable is a reduced likelihood of head pressure upstream from the pump during circulation, particularly in the vertical discharge line, in order to alleviate the likelihood that hot asphalt will flow up through the vertical discharge pump when the valve is opened.

The hot asphalt valve of the present invention is directed to improving the above characteristics, as well as others which will become apparent below.

SUMMARY OF THE INVENTION

The present invention is an improved hot valve system for use in a hot melting kettle having an interior, heating means for heating asphalt or other substances in the kettle, and a pump for circulating the asphalt within the kettle and for pumping the asphalt from the kettle to a work site.

The improved hot valve system includes a surge chamber which is in fluid communication with the discharge pipe and which has a cross-sectional area greater than that of the discharge pipe. The surge chamber has an inlet in fluid communication with the output port of the pump, and a circulation outlet open to the interior of the kettle.

A valve is provided which has a valve seat moveable between a closed condition substantially blocking the circulation outlet of the surge chamber and an opened condition spaced from the circulation outlet of the surge chamber. The valve is moved between the closed and open conditions by actuating means.

When the hot valve is in the opened condition, asphalt entering the valve exits the valve through the circulation outlet and re-enters the melting kettle, and when the valve is in the closed condition asphalt entering the valve is caused to flow through a discharge line to a work site, such as a roof.

Because the cross-sectional area of the surge chamber is larger than that of the vertical discharge pipe, the surge chamber acts as a reservoir for asphalt flowing from the pump and thus reduces the chance of head pressure upstream from the pump when the valve is opened. Moreover, the large size of the surge chamber reduces the likelihood of clogging and carbon build-up in the valve and pump lines, and it reduces the number of restrictive flow lines which can be susceptible to clogging and carbon build-up. Finally, the number of fittings and elbow pipes in the system can be reduced and back pressure on the pump and engine may therefore be minimized.

DETAILED DESCRIPTION OF THE PREFERRED EMBODIMENT

A. Structure

Figure 1:
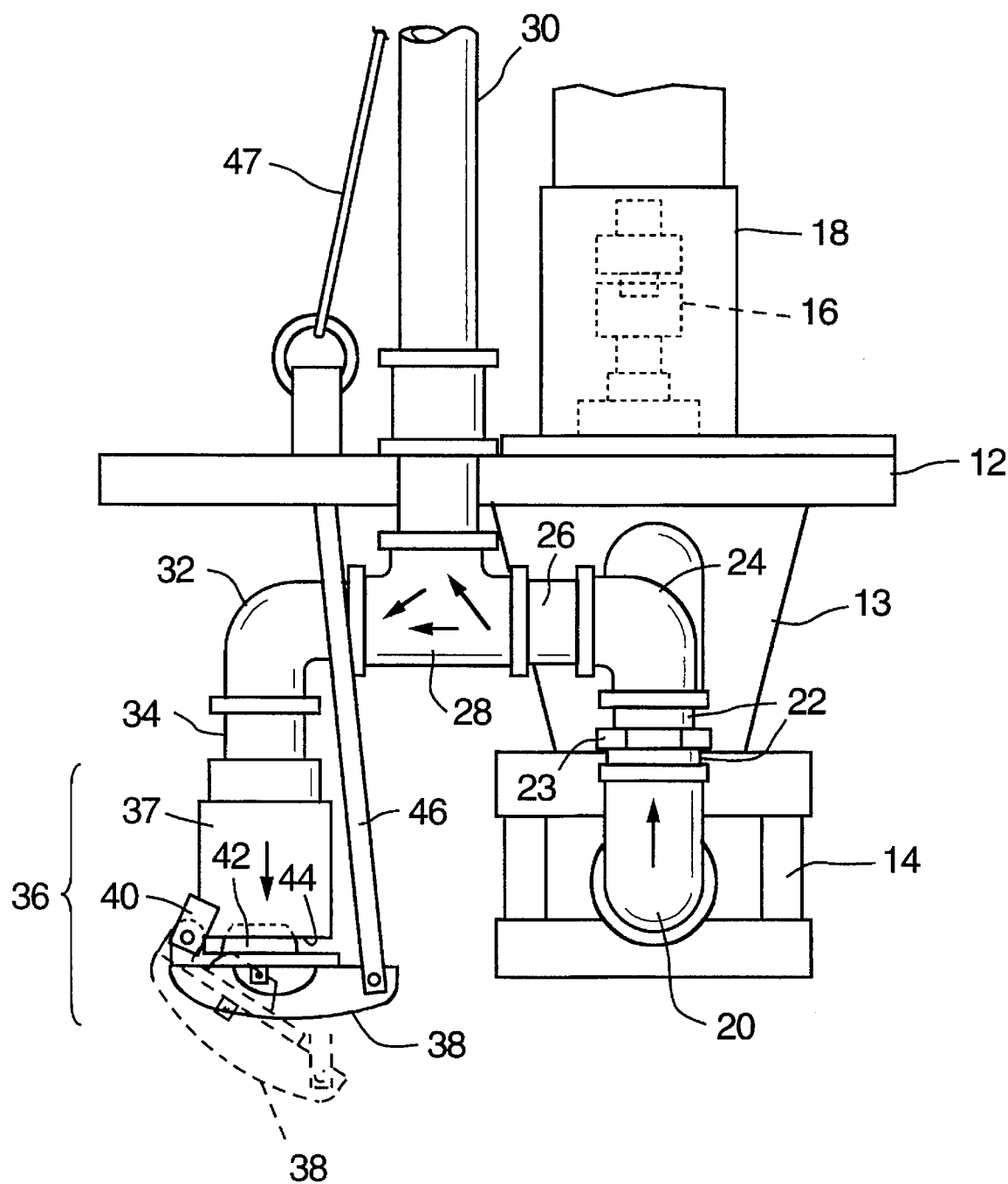
FIG. 1 is a side elevation view of a prior art submerged pump and hot valve system.
Figure 2:
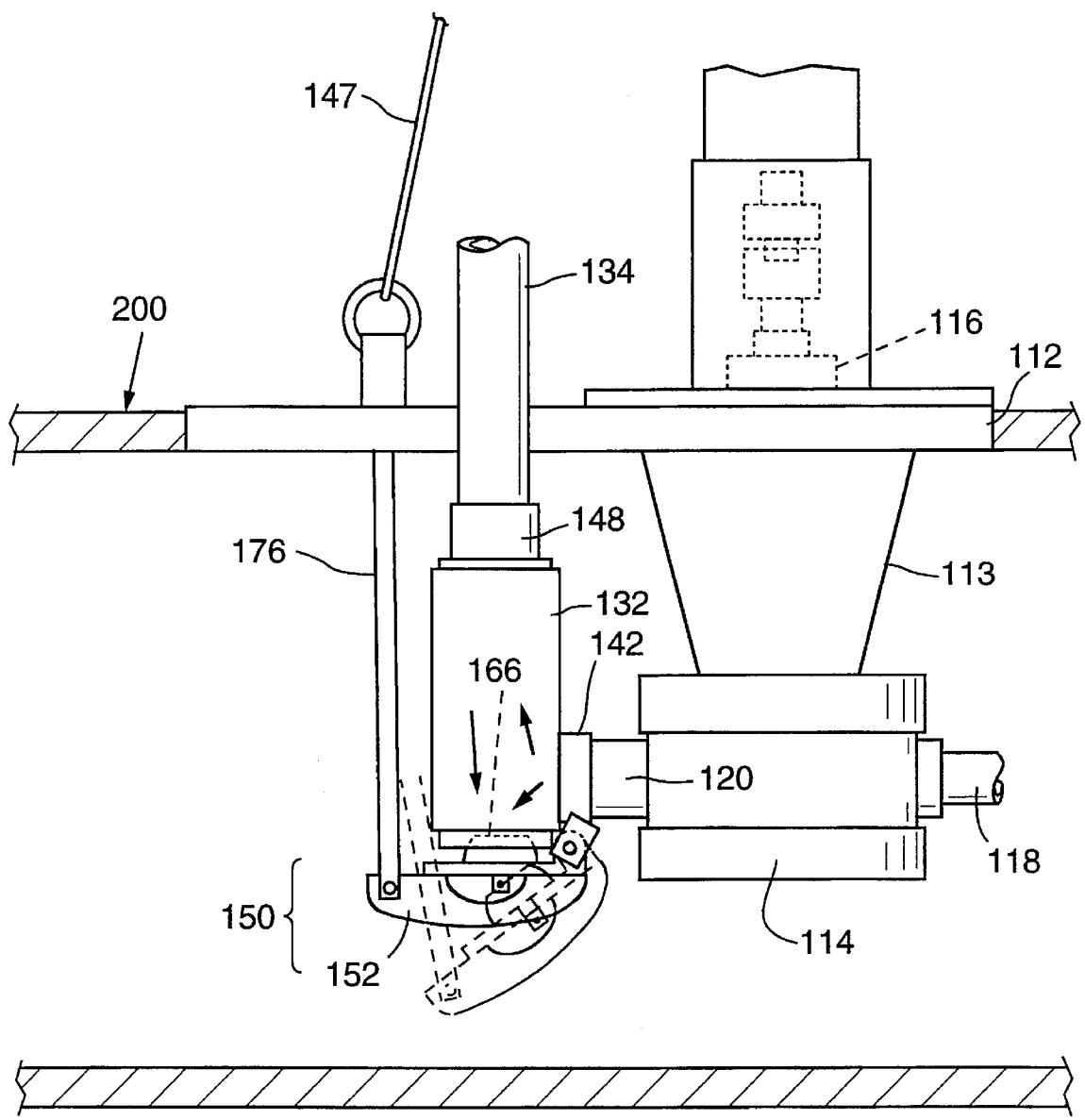
FIG. 2 is a rear elevation view of a hot valve according to the present invention coupled to a submerged pump system.

Referring to FIG. 2, the hot valve system according to the present invention is preferably used in connection with a conventional submerged pump system. The pump system includes a platform 112 which covers an opening in a conventional melting kettle partially shown in cross-section and designated 200 in FIG. 2. Like the prior art submerged pump and hot valve systems, the system used in practicing the preferred embodiment of the invention includes a drive unit 116 mounted on top of platform 112 and a rotor shaft (not shown) inside a rotor shaft housing 113 suspended from and connected to platform 112. A pump 114 is driven by the rotor shaft and drive components, which are in turn powered by an engine (not shown). The pump 114 is positioned such that it extends into the melting kettle when the platform 112 is in place over the kettle opening and such that it is immersed in asphalt within the kettle during use.

A conventional inlet pipe 118 is attached to the pump 114 and provides a port through which asphalt in the kettle feeds into the pump 114. A surge chamber 132 is connected to the pump output, preferably by a straight pipe 120, although as with any pipe connection described herein couplings utilizing various combinations of pipes and fittings may also be used within the scope of the present invention.

The surge chamber 132 is preferably vertically oriented. Attached to and preferably extending vertically from the surge chamber 132 at outlet connector 148 is a vertical discharge pipe 134 which is the pipe through which asphalt is delivered to a roof during use.

Figure 3:
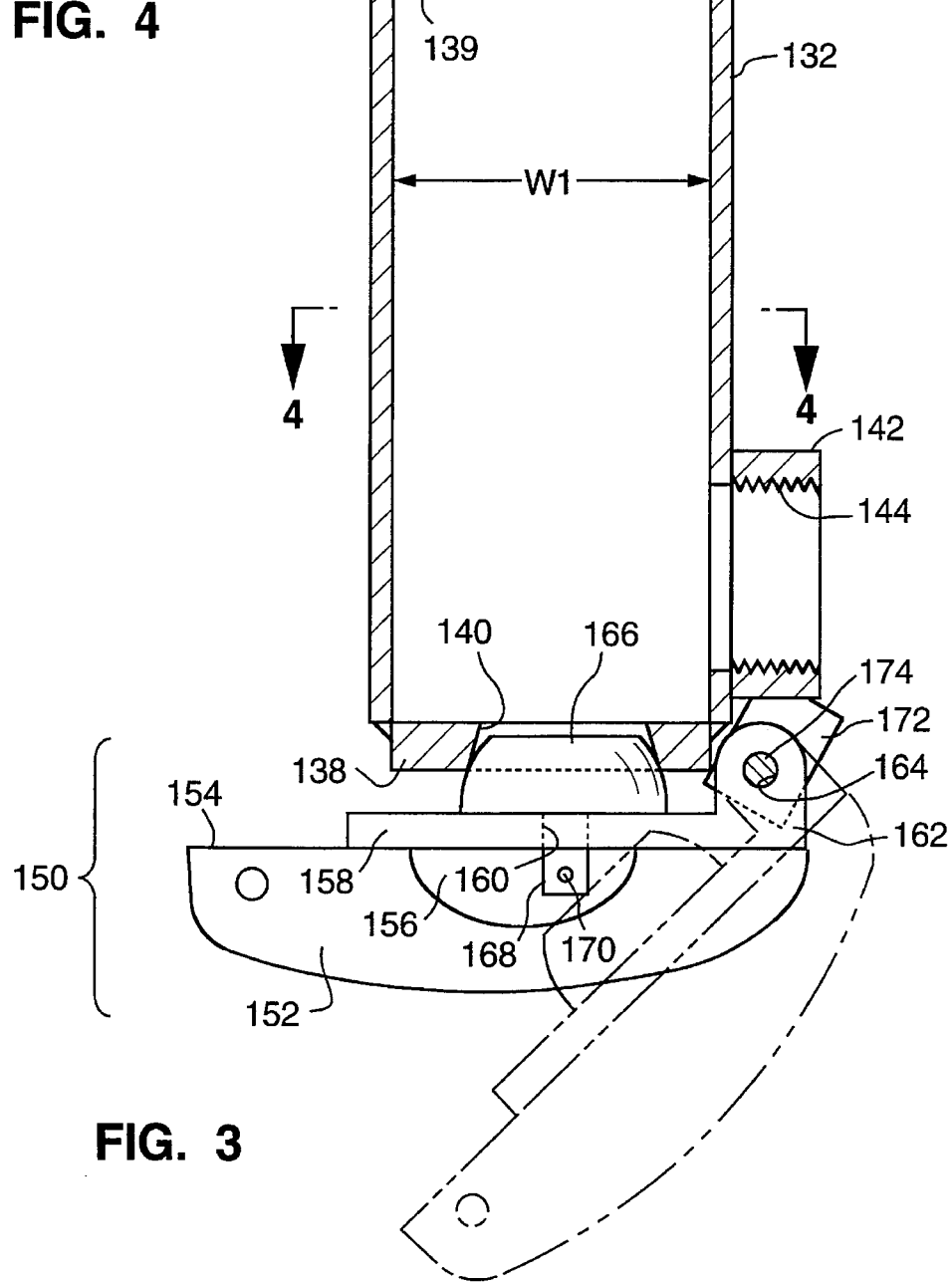
FIG. 3 is a cross sectional side view of a hot valve according to the present invention.

Referring to FIG. 3, surge chamber 132 has a substantially horizontal inlet connector 142 having a threaded interior wall 144. Straight pipe 120 is engaged with threaded interior 144 of inlet connector 142. Vertically oriented outlet connector 148 is preferably attached to vertical discharge pipe 134 (FIG. 2) in a similar fashion.

Figure 4:
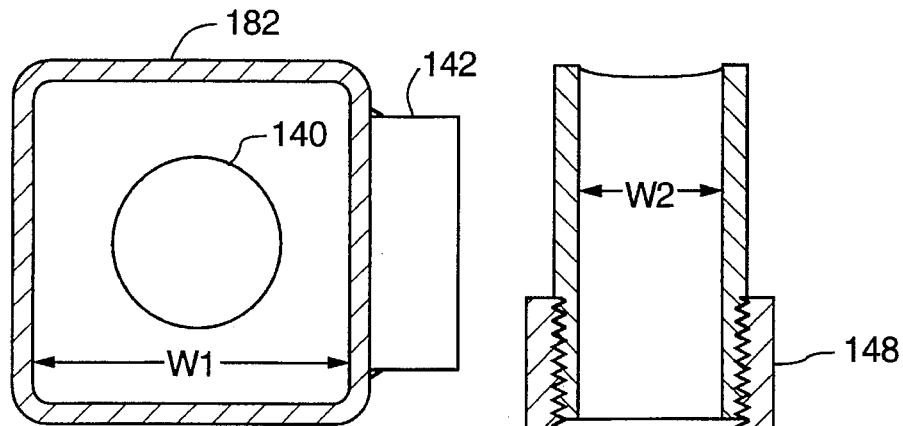
FIG. 4 is a cross sectional top view of the hot valve of the present invention taken along the plane designated 4—4 in FIG. 3.

As can be seen in FIG. 4, surge chamber 132 preferably has a substantially square cross-section. Moreover, the width W1 of surge chamber 132 is greater than the width W2 of vertical discharge pipe 134 (FIG. 2), and the cross-sectional area (which, in the preferred embodiment is the area lying within the horizontal plane) of surge chamber 132 is greater than the cross-sectional area of vertical discharge pipe 134.

In the preferred embodiment, the surge chamber 132 is formed of an 8" piece of 4"×4"×½" tube steel and has a 2" diameter inlet connector 142 and a 2" diameter outlet connector 148. The vertical discharge pipe has an inner diameter of approximately 2".

End plates 138, 139 are preferably welded onto the square tube. Alternatively, surge chamber 132 may be cylindrical or another shape.

Referring to FIG. 3, surge chamber 132 has a bottom wall 138 having a bore 140 extending through it. Bore 140 is preferably chamfered by approximately 16° such that it has a smaller diameter at the side of wall 138 which faces into the surge chamber 132 and a greater diameter at the exterior of the wall 138. The diameters of bore 140 are smaller than the diameter of the surge chamber itself. The bore 140 is an outlet through which asphalt flows from the surge chamber 132 into the kettle for re-circulation within the kettle. The bore 140 is preferably adjacent to the inlet at connector 142.

A swing valve 150 similar to those conventionally used for hot valves is provided for opening and closing fluid flow through chamfered bore 140. Referring to FIG. 3, the valve 150 is comprised of an operating lever 152 which, as will be described in detail below, is pivotally mounted to the surge chamber 132. Operating lever 152 has a substantially flat side 154 facing the surge chamber 132. A cutout 156 is formed in flat side 154. A plate 158 is attached to the flat side 154, and covers the portion of cutout 156 at the flat side 154 of the operating lever 152.

Plate 158 has a bore 160 extending perpendicularly through it, and a hinge member 162 extending perpendicularly of the plate 158. Another bore 164 is formed in the hinge member 162.

A valve seat 166 is connected to the operating lever 152. The valve seat 166 includes a post 168 which extends through bore 160 on plate 158 and which is held in place by means of a pin (not shown) extending through a bore 170 in the post 168. Valve seat 166 is proportioned to block the flow of asphalt through chamfered bore 140 in surge chamber 132 when the valve seat is positioned within the chamfered bore 140.

A second hinge member 172 is attached to surge chamber 132. First hinge member 162 is pivotally attached to the second hinge member 172 by a pin 174 (shown in cross-section in FIG. 3)) passing through bore 164 in first hinge member 162 and through a corresponding bore in second hinge member 172.

The connection between hinge members 162, 172 provides a hinged connection between surge chamber 132 and operating lever 152. Thus, the operating lever is movable between a closed position (shown in solid lines in FIG. 3) in which the valve seat 166 is engaged within the chamfered bore 140, and an open position (shown in dashed lines) in which the valve seat 166 is pivoted away from chamfered bore 140 to permit asphalt flow through the bore 140. A rod linkage 176 (FIG. 2) is connected to operating lever 152 opposite from the hinge member 162 and allows the operating lever to be manually moved between the open and closed positions in a conventional manner, as is described above with respect to the prior art.

The surge chamber 132, valve 136 and related components may be made from steel, cast iron or other suitable material.

B. Operation

Operation of the hot valve and submerged pump assembly of the present invention will next be described. The melting kettle (not shown) is preferably positioned with the vertical discharge pipe extending to a roof to which asphalt is to be applied. Asphalt is placed in the kettle where it is melted and heated to a desired application temperature by a heating means provided in the melting kettle.

Referring to FIG. 2, when the pump and hot valve assembly is submerged in a melting kettle and the engine turned on, molten asphalt flows into the pump via pipe 118, through the pump 114, and into surge chamber 132 through straight pipe 120 and inlet connector 142 (FIG. 3).

A worker stationed on the roof controls the opening and closing of the valve and thereby controls whether the asphalt entering the surge chamber 132 is pumped to the roof via the discharge pipe 134 or circulated back into the kettle via the chamfered bore 140 in surge chamber 132.

To initiate flow of asphalt to the roof, the worker closes the valve 150 by pulling rope 147 coupled to the linkage 176 to pivot the operating lever 152 and valve seat 166 into the closed condition. When operating lever 152 is in the closed condition, valve seat 166 prevents asphalt from flowing through chamfered bore 140. The molten asphalt moves upwardly through surge chamber 132 and vertical discharge pipe 134 where it is directed onto a roof by the worker.

To stop asphalt flow to the roof, the worker releases tension on the rope 147. Fluid pressure against the valve seat forces the valve open, causing the operating lever 152 and valve seat 166 to pivot into the opened condition. When operating lever 152 is in the opened condition, the asphalt flows through chamfered bore 140 (FIG. 3) and back into the melting kettle. This provides continuous circulation of the asphalt through the kettle and thereby helps to maintain the asphalt at a uniform temperature.

During the asphalt applying process, the worker will intermittently open and close operating lever 152 by actuation of rod 176 (via rope 147) in order to control the amount of asphalt being delivered to the roof. When, while asphalt is being delivered to the roof, the worker opens operating lever 152, asphalt entering surge chamber 132 from the pump 114 will travel downwardly through chamfered bore 140 and any excess asphalt within surge chamber 132 and vertical discharge pipe 134 will fall downwardly by force of gravity and will exit the system through the bore 140.

C. Conclusion

A new hot valve system for use with a submerged pump system has been described with respect to a preferred embodiment. This description is not intended in a limiting sense, as modification to and variation of the preferred embodiment can be made without departing from the scope of the present invention as defined by the appended claims. Moreover, while the present invention was described with respect to asphalt roofing applications, it should be appreciated that the invention may be applied to different materials and/or applications.

What is claimed is:

1. A hot valve for immersion into a hot melting kettle wherein a pump circulates a substance within the kettle and pumps the substance out of the kettle through a discharge pipe having a cross-sectional area, and wherein the pump includes an output port within the kettle, the hot valve comprising:

a surge chamber in fluid communication with the discharge pipe, the surge chamber including a cross-sectional area greater than the cross-sectional area of the discharge pipe and further including an inlet in fluid communication with the output port of the pump and a circulation outlet open to the interior of the kettle, the surge chamber having a discharge outlet fluidly coupled with the discharge pipe, the surge chamber and discharge pipe arranged such that a flow path extends from the output port of the pump, through the surge chamber, and into the discharge pipe; and a valve having a valve seat moveable between a closed condition at least partially obstructing the circulation outlet of the surge chamber and an opened condition in which the valve seat is outside of and spaced from the circulation outlet of the surge chamber; and actuating means for moving the valve between the closed and open conditions.

2. The hot valve of claim 1 wherein the surge chamber extends substantially longitudinally of the discharge pipe.

3. The hot valve claim 1 wherein the surge chamber extends substantially longitudinally of the discharge pipe and wherein the surge chamber is substantially vertically oriented.

4. The hot valve of claim 1 wherein the surge chamber is substantially vertically oriented and wherein the discharge outlet is located at the top of the surge chamber, the inlet is positioned at the side of surge chamber, and the circulation outlet is located at the bottom of the surge chamber.

5. The hot valve of claim 1 further comprising a substantially straight coupling between the output port of the pump and the inlet of the surge chamber.

6. The hot valve of claim 5 wherein the coupling is substantially horizontally oriented.

7. The hot valve of claim 1 wherein the inlet of the surge chamber is adjacent to the circulation outlet.

8. In a hot melting kettle having an interior for containing a heated substance, a pump including an output port within the kettle, the pump for circulating the substance within the kettle and for pumping the substance out of the kettle, a discharge pipe having a cross-sectional area, a valve having a valve seat, and actuating means for moving the valve between closed and open conditions, the improvement comprising:

a surge chamber having a discharge outlet in fluid communication with the discharge pipe, the surge chamber including a cross-sectional area greater than the cross-sectional area of the discharge pipe and further including an inlet in fluid communication with the output port of the pump and a circulation outlet open to the interior of the kettle, wherein the valve seat at least partially obstructs the circulation outlet when the valve seat is in the closed condition, and wherein the valve seat is outside of and spaced from the circulation outlet of the surge chamber when in its opened condition.

9. The improved melting kettle of claim 8 wherein the surge chamber extends substantially longitudinally of the discharge pipe.

10. The improved melting kettle of claim 8 wherein the surge chamber extends substantially longitudinally of the discharge pipe and wherein the surge chamber is substantially vertically oriented.

11. The improved melting kettle of claim 8 wherein the surge chamber is substantially vertically oriented and wherein the discharge outlet is located at the top of the surge chamber, the inlet is positioned at the side of surge chamber, and the circulation outlet is located at the bottom of the surge chamber.

12. The improved melting kettle of claim 8 further comprising a substantially straight coupling between the output port of the pump and the inlet of the surge chamber.

13. The improved melting kettle of claim 12 wherein the coupling is substantially horizontally oriented.

14. The improved melting kettle of claim 13 wherein the inlet of the surge chamber is adjacent to the circulation outlet.

15. In a hot melting kettle having an interior for containing a heated substance, a pump including an output port within the kettle, the pump for circulating the substance within the kettle and for pumping the substance out of the kettle, a substantially vertically-oriented discharge pipe having a cross-sectional area, a valve having a valve seat, and actuating means for moving the valve between closed and open conditions, the improvement comprising:

a substantially vertically-oriented surge chamber extending longitudinally of the discharge pipe, the surge chamber having a discharge outlet in fluid communication with the discharge pipe, the surge chamber including a cross-sectional area greater than the cross-sectional area of the discharge pipe and further including an inlet in fluid communication with the output port of the pump and a circulation outlet open to the interior of the kettle, wherein the valve seat at least partially obstructs the circulation outlet when the valve seat is in the closed condition, and wherein the valve seat is outside of and spaced from the circulation outlet of the surge chamber when in its opened condition.

16. The improved melting kettle of claim 15 wherein the discharge outlet is located at the top of the surge chamber, the inlet is positioned at the side of surge chamber, and the circulation outlet is located at the bottom of the surge chamber.

17. The improved melting kettle of claim 15 further comprising a substantially straight coupling between the output port of the pump and the inlet of the surge chamber.

18. The improved melting kettle of claim 17 wherein the coupling is substantially horizontally oriented.

19. The improved melting kettle of claim 18 wherein the inlet of the surge chamber is adjacent to the circulation outlet.

* * * * *